V. EMDEN & F. H. DEARBORN.
AUTOMATIC STOPPING DEVICE FOR MOTOR VEHICLES.
APPLICATION FILED FEB. 16, 1910.

956,952.

Patented May 3, 1910.

Witnesses
J. G. Stinkel
H. P. Roberts

Inventors:
Victor Emden,
Frank H. Dearborn,
by C. N. Mason, Attorney.

UNITED STATES PATENT OFFICE.

VICTOR EMDEN AND FRANK H. DEARBORN, OF NEW YORK, N. Y.

AUTOMATIC STOPPING DEVICE FOR MOTOR-VEHICLES.

956,952. Specification of Letters Patent. Patented May 3, 1910.

Application filed February 16, 1910. Serial No. 544,180.

*To all whom it may concern:*

Be it known that we, VICTOR EMDEN and FRANK H. DEARBORN, citizens of the United States, residing at New York, in the county of New York and State of New York, have invented certain new and useful Improvements in Automatic Stopping Devices for Motor-Vehicles, of which the following is a specification.

This invention relates to attachments for motor cars, and more particularly to an automatic stopping device for rendering the driving mechanism of a car inoperative, in the event of a collision or of contact of the forward part of the car with any object.

An important object of the invention is to provide mechanism at the forward portion of the car whose construction and arrangement are such that when a part of such mechanism meets an obstruction a switch or other circuit closing device is actuated to interrupt the current of electricity which produces the spark for igniting the charge of the hydro-carbon or similar engine, or, in case the car is driven by an electric or similar motor, interrupts the circuit for supplying the current to said motor.

The mechanism referred to is preferably arranged in connection with a suitable detent which is automatically actuated, upon the breaking of the circuit, to hold a switch or similar circuit breaker inoperative until manually shifted to restore the parts to circuit-closing position, whereby the driver of the motor car is required to leave his seat before he can again start his car. This construction insures care on the part of drivers of motor vehicles, and is a check on reckless driving, for, if the car should be so driven through recklessness or otherwise, as to injure any person, either by contact with the forward portion of the car, or by passing over any portion of the person, the car would be instantly brought to a stop and could not be restarted by the operator in time to permit him to escape the consequences of his reckless, or careless driving.

The invention will be hereinafter more particularly described, and the novel features thereof pointed out in the claims.

Figure 1:
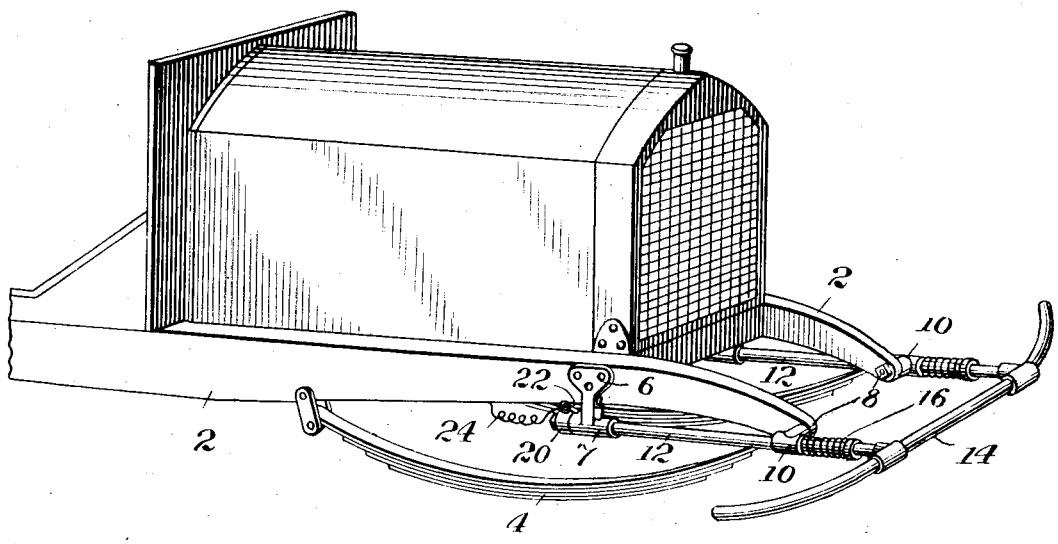
Figure 2:
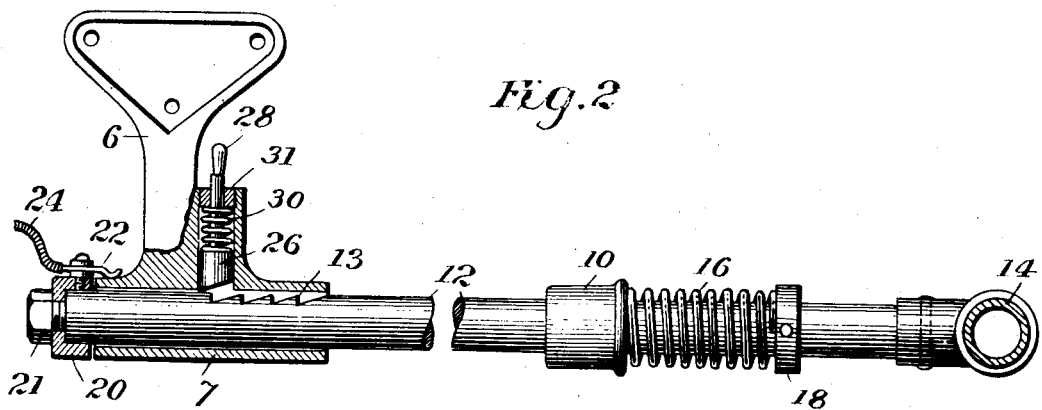

In the drawings: Figure 1 represents the forward part of a motor car with our invention applied thereto; Fig. 2 represents an enlarged detail view, partly sectional, of the salient features of the invention.

The numeral 2 indicates the forward side members of the frame of an automobile, or other motor-driven vehicle, having the usual springs 4 which are shown as being secured to the extremities of the frame members 2 by bolts 8. These bolts, as shown, also support sleeves 10 within which are mounted to reciprocate the rods 12, having at their forward extremities a suitable rail or bumper 14, rigidly secured to said rods. Brackets 6 are bolted or otherwise rigidly fastened to the frame members 2, upon opposite sides of the car, and said brackets carry guiding sleeves 7 which support the rear ends of the rods 12, which rods slide freely through the sleeves and are guided therein. Collars 18 surround the rods 12 near their forward extremities, and are rigidly fastened thereto by set screws, or similar means, and surrounding the rods and interposed between the sleeves 10 and collars 18 are preferably yielding devices, herein shown as spiral springs 16. The rear extremities of the rods 12 are shown as provided with caps 20 which fit over screw-threaded extensions of the rods and are held against shoulders thereon by nuts 21, or any desirable means therefor. One of said caps is provided with a plate 22 which is secured to the cap by a screw, or the like, and forms one terminal of a wire 24 connected with the sparking or power circuit of the car.

In the normal position of the parts, as shown in Fig. 2 of the drawings, the plate 22 rests upon an extension of the bracket 6 and forms a ground connection with the frame of the machine, said parts being maintained in this position by the springs 16 which normally act to force the rods 12 outwardly and hold the cap 20 against the rear extremity of the sleeve 7.

The rod 12 which carries the circuit breaker or switch plate 22 is shown as being provided on its upper surface with a suitable number of notches 13, and the bracket 6 is shown as having a bore within which plays a suitable detent 26, herein represented as a plunger, having a guiding rod which extends through a perforated plug 31 closing the end of said bore, said rod terminating in a handle 28, as shown. Located between the plunger 26 and the plug 31 is a spring 30, which normally tends to force the detent 26 downwardly so as to cause it to enter one of the notches 13, when the rod 12 has been moved rearwardly a distance sufficient to carry the circuit breaker 22 out of contact with that portion of the bracket 6 upon which the circuit breaker rests when the parts are in their normal positions, as shown in Fig. 2.

With the parts as above described, it will be seen that when the car is in operation, the springs 16 will maintain the rods 12 in their forward position, the circuit breaker 22 will be in contact with the bracket 6, and the lower end of the detent 26 will be elevated and rest upon a portion of the rod 12 to the rear of the notches 13. If, in the operation of the car, the bar 14 should meet any obstruction, as from a collision with an object, the bar would be forced rearwardly thereby removing the plate 22 from the frame, and so interrupt the current that supplies the ignition device that the motor will stop, and the car be brought to rest. When the current is interrupted in the manner described the detent 26 will be forced by its spring into one of the notches 13 and will hold the parts in this position until they have been restored by the operator, who must leave his seat in order to manipulate the handle 28 and lift the detent out of locking engagement with the bar 12. This will effectively prevent an operator from escaping in case his car has run over or injured a person, as the time occupied in resetting the apparatus will ordinarily be sufficient to permit persons who have witnessed the accident to determine the identity of the driver of the car before he can leave the scene of the accident.

While we have shown and described a specific form of fender or bumper mechanism for actuating the switch and interrupting the sparking circuit of a car, it is to be understood that the invention is not limited to use therewith, and that any suitable construction and arrangement of parts which will transmit the force due to the impact of the forward portion of the car with any object to a suitable circuit breaker, is well within the contemplation of our invention. It is also to be understood that the construction of the parts may be varied materially from those herein illustrated and described, without departing from the principles of the invention, so long as they fall within the scope of the following claims.

Having thus described our invention what we claim as new and desire to secure by Letters Patent of the United States is:—

1. In an apparatus of the class described, the combination with a motor vehicle, of a guide carried thereby, a contact device having a rod fitting said guide and provided with a circuit-controller arranged to normally occupy a closed position, and a locking device arranged to coöperate with said rod when the circuit-controller is in open position and maintain said parts in condition to prevent the operation of the motor until said parts are restored to normal position by manipulation of the lock by the operator.

2. In an apparatus of the class described, the combination with a motor vehicle, of a guide carried thereby, a contact device having a rod fitting said guide and provided with a circuit controller, yielding means for holding the circuit controller in closed position, and a locking device arranged to coöperate with said rod when the circuit controller is in open position and maintain said parts in condition to prevent the operation of the motor until said parts are restored to normal position by manipulation of the lock by the operator.

3. In an apparatus of the class described, the combination with a motor vehicle, of a guide carried thereby, a contact device provided with a rod arranged to slide in said guide, said rod having notches, a circuit controller on said rod arranged to contact with said sleeve and complete the circuit of the ignition system of the motor, yielding means acting normally to hold the circuit controller in closed position, a detent carried by said sleeve and arranged to enter a notch in said rod when the rod is moved rearwardly and hold the circuit controller in open position, and means whereby said detent may be removed from locking engagement with the rod to permit the yielding means to restore the circuit controller to closed position.

4. In an apparatus of the class described, the combination with a motor vehicle, of a sleeve carried thereby, a contact device provided with a rod arranged to slide in said sleeve, said rod having notches, a cap at the end of the rod arranged to abut against said sleeve, a circuit controller on said rod arranged to contact with said sleeve and complete the circuit of the ignition system of the motor, yielding means acting normally to hold the circuit controller in closed position, a detent carried by said sleeve and arranged to enter a notch in said rod when the rod is moved rearwardly and hold the circuit controller in open position, and means whereby said detent may be removed from locking engagement with the rod to permit the yielding means to restore the circuit controller to closed position.

In testimony whereof we affix our signatures in presence of two witnesses.

VICTOR EMDEN.
FRANK H. DEARBORN.

Witnesses:
C. A. MASON,
H. P. ROBERT.